United States Patent
Guidry et al.

(10) Patent No.: US 8,727,755 B2
(45) Date of Patent: May 20, 2014

(54) DOWNHOLE IMPRESSION IMAGING SYSTEM AND METHODS USING SHAPE MEMORY MATERIAL

(75) Inventors: Christopher W. Guidry, Spring, TX (US); Edward O'Malley, Houston, TX (US); Erik Nordenstam, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 294 days.

(21) Appl. No.: 13/371,404

(22) Filed: Feb. 11, 2012

(65) Prior Publication Data

US 2013/0207301 A1 Aug. 15, 2013

(51) Int. Cl.
*B29C 33/38* (2006.01)

(52) U.S. Cl.
USPC .............................. 425/59; 425/182; 264/320

(58) Field of Classification Search
USPC ..................................... 425/59, 182; 264/320
See application file for complete search history.

(56) References Cited

U.S. PATENT DOCUMENTS

| | | | |
|---|---|---|---|
| 2,824,378 A * | 2/1958 | Stokes | 33/561.1 |
| 8,403,056 B2 * | 3/2013 | Gette et al. | 166/348 |
| 2009/0195647 A1 | 8/2009 | Lynde | 348/81 |
| 2010/0212890 A1 * | 8/2010 | Lund | 166/250.01 |

OTHER PUBLICATIONS

"Lead Impression Blocks" (National Oilwell Varco Brochure) 2006, 1 page.
"Lead Impression Blocks" (National Oilwell Varco Brochure) 2007, 1 page.

* cited by examiner

*Primary Examiner* — James Sanders
(74) *Attorney, Agent, or Firm* — Shawn Hunter

(57) ABSTRACT

A system and method for obtaining an impression of an object in a remote environment. An impression block is affixed to a running string and disposed into the remote environment and used to form an impression. The impression block includes an impression section formed of a shape memory material that can be transformed between an original shape and a temporary shape.

12 Claims, 5 Drawing Sheets

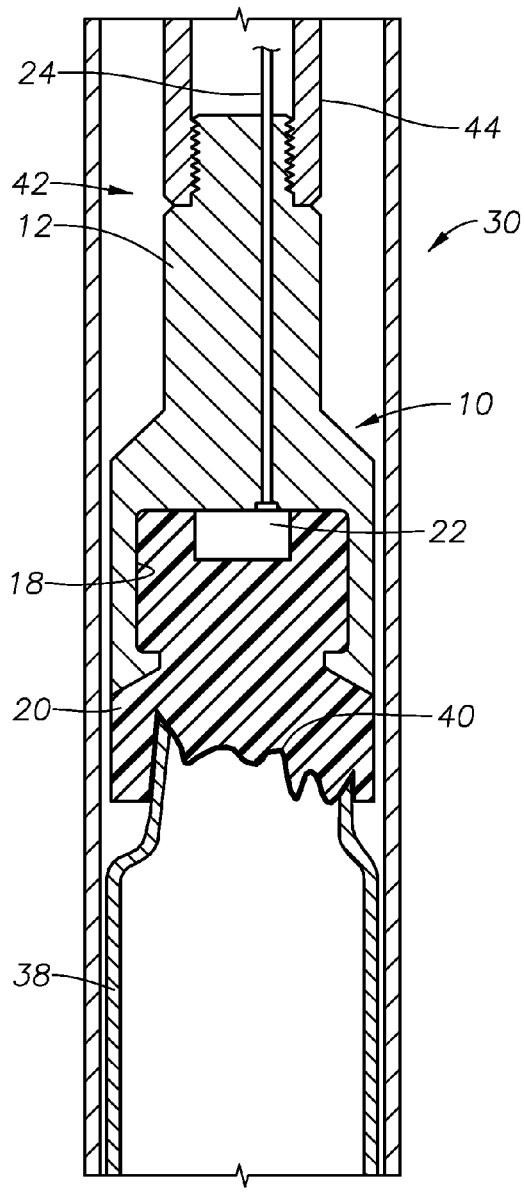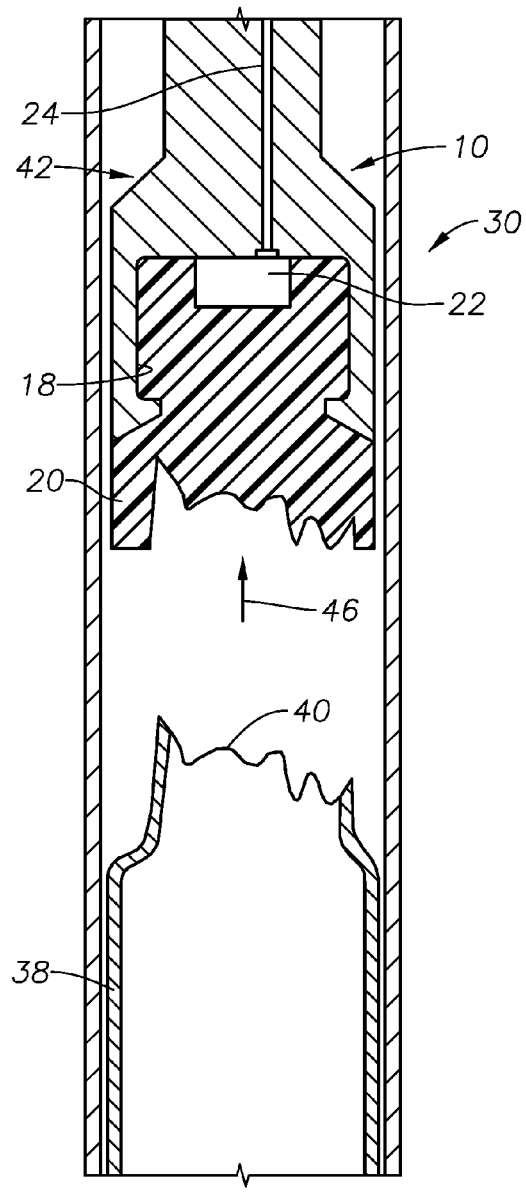
Fig. 3
Fig. 4

DOWNHOLE IMPRESSION IMAGING SYSTEM AND METHODS USING SHAPE MEMORY MATERIAL

BACKGROUND OF THE INVENTION

1. Field of the Invention

The invention relates generally to devices and methods used to assist in removal of stuck tools or objects from a wellbore or other remote location by fishing.

2. Description of the Related Art

Fishing is used to remove tools or other objects that have become stuck within a wellbore. Stuck tools or objects can have irregular surfaces onto which it is difficult to latch a fishing tool. It is useful for an operator to have information relating to the geometry of the stuck device or object so that appropriate fishing tool(s) can be used to best try to remove the stuck device or object.

SUMMARY OF THE INVENTION

The invention provides devices and methods for creating a three-dimensional image or impression of a stuck tool or device in a remote environment, such as within a subterranean or subsea hydrocarbon-production wellbore. In certain described embodiments, an impression block is provided that includes an impression section formed of a shape memory polymer material and a heating mechanism. The heating mechanism is capable of heating the impression section to a transition temperature that allows the section to be deformed from an original shape to a temporary deformed shape. In some embodiments, the heating mechanism includes a heating filament that helps distribute heating within the impression section. In other embodiments, the heating mechanism is a chemical heating mechanism.

In a described method of operation, the impression block is incorporated into a running tool and disposed into a wellbore that contains a stuck tool or object. The impression section of the impression block has an initial shape and is preferably unheated so that it is at a temperature that is below its transition temperature. The impression block is brought into contact with the stuck tool or object. The heating mechanism is actuated to heat the impression section until it reaches its transition temperature. The impression section is then allowed to conform to the upper surfaces of the stuck tool or object to create an impression within the impression section. In particular embodiments, weight is applied to the running string to assist formation of the impression.

Once the impression has been formed, the heating mechanism is turned off and the impression section cools. Upon cooling, the impression section maintains the impression in its temporary shape. The impression block is then removed from the wellbore. In one embodiment, the impression is used as a mold to create a positive 3D model of the upper surface of the stuck tool.

An alternative embodiment is described wherein the impression section is formed of a metallic shape memory material, such as alloy. The metallic shape memory material can be deformed from an original shape to a temporary shape below a transition temperature and will subsequently transition back to the original shape when heated up to or above a transition temperature. In particular embodiments, the metallic shape memory material is formed into an impression block that includes a thin, easily deformed element, such as a thin plate or mesh.

BRIEF DESCRIPTION OF THE DRAWINGS

The advantages and further aspects of the invention will be readily appreciated by those of ordinary skill in the art as the same becomes better understood by reference to the following detailed description when considered in conjunction with the accompanying drawings in which like reference characters designate like or similar elements throughout the several figures of the drawing and wherein:

FIG. 3 is an enlarged, side, cross-sectional view of the wellbore with an exemplary impression imaging system being used to create an impression of an upper surface of the stuck tool.

FIG. 4 is an enlarged, side, cross-sectional view of the wellbore with the impression imaging system of FIG. 3 now being removed from the wellbore.

DETAILED DESCRIPTION OF THE PREFERRED EMBODIMENTS

Figure 1:
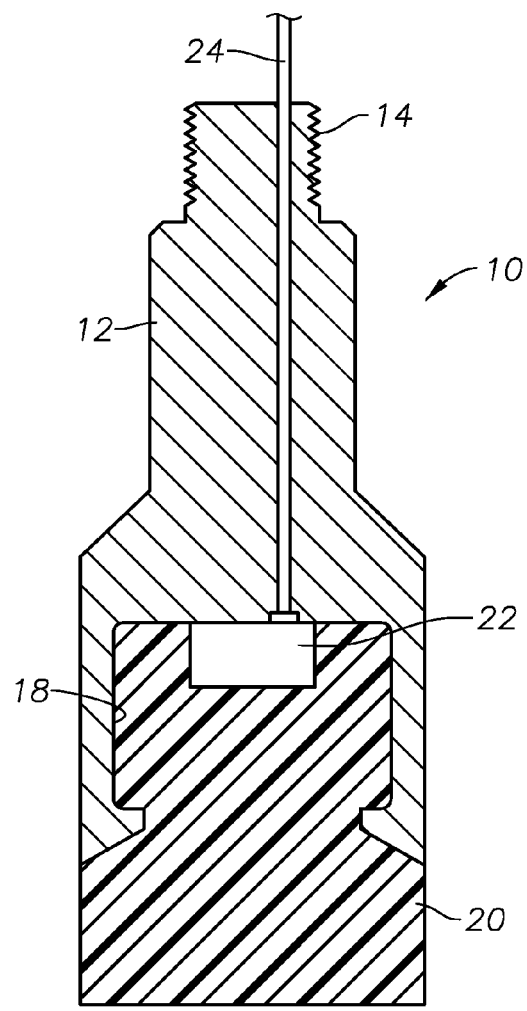
FIG. 1 is a side, cross-sectional view of an exemplary downhole impression block for an impression imaging system constructed in accordance with the present invention.

FIG. 1 illustrates an exemplary impression block 10 in accordance with the present invention. The impression block 10 includes a retaining section 12 having a threaded portion 14. The threaded portion 14 is provided so that the impression block 10 can be affixed to a running string, such as running string 44 in FIG. 2. A recess 18 is formed within the retaining section 12, and an impression section 20 is disposed within the recess 18. The impression section 20 is formed or substantially formed of a shape memory material, such as a polymer, that can be changed between an original shape and a temporary shape while at or above a predetermined transition temperature and that will remain in either the original or temporary shape when at a temperature that is below the transition temperature. In particular described embodiments the shape memory material is a shape memory polymer, which may be one of the polyurethane materials described in U.S. Pat. No. 8,048,348 issued to Duan et al. U.S. Pat. No. 8,048,348 is owned by the assignee of the present invention and is hereby incorporated by reference in its entirety. It is noted that the transition temperature of the polymer section 20 should be higher than the highest temperature that is expected within the wellbore environment into which the impression section 20 will be placed.

The impression block 10 also includes a heating mechanism 22 that is operable to heat the impression section 20. FIG. 1 shows an exemplary heating mechanism 22 that can be selectively actuated by being energized to heat the impression section 20 up to its transition temperature and de-energized to allow the impression section 20 to cool below its transition temperature. In the depicted embodiment, the heating mechanism 22 is electrically energized and can be turned on or off from the surface of a wellbore. An electrical line 24 is shown that is used to supply electrical power to the heating mechanism 22.

Figure 1A:
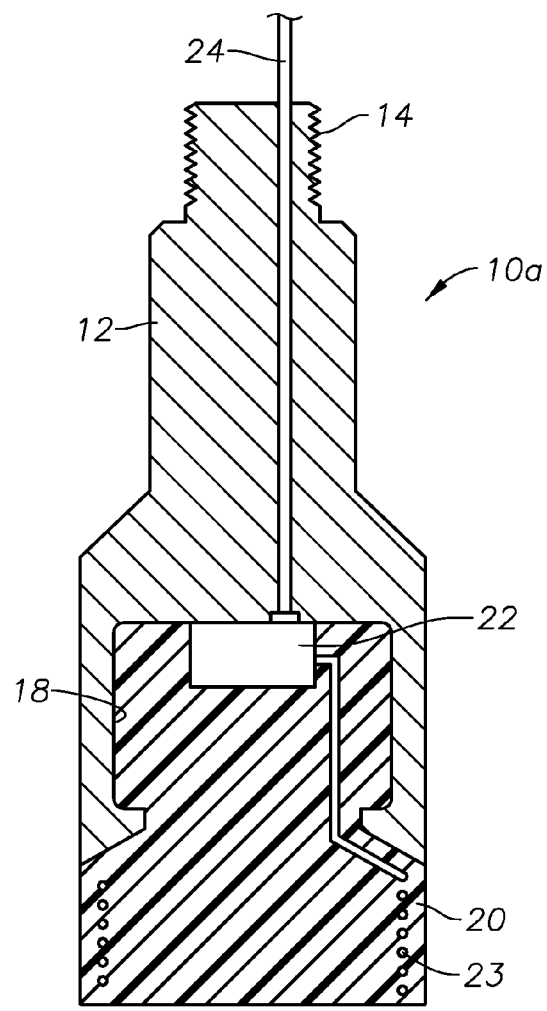
FIG. 1A is side, cross-sectional view of an alternative downhole impression block for a downhole impression imaging system.
Figure 1B:
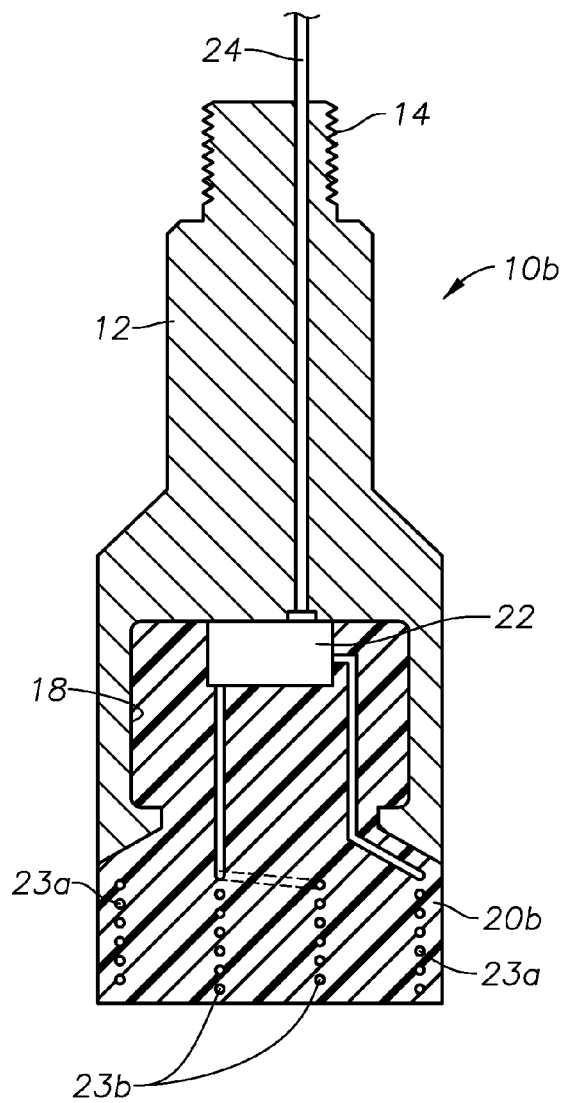
FIG. 1B is a side, cross-sectional view of a further alternative downhole impression block.
Figure 1C:
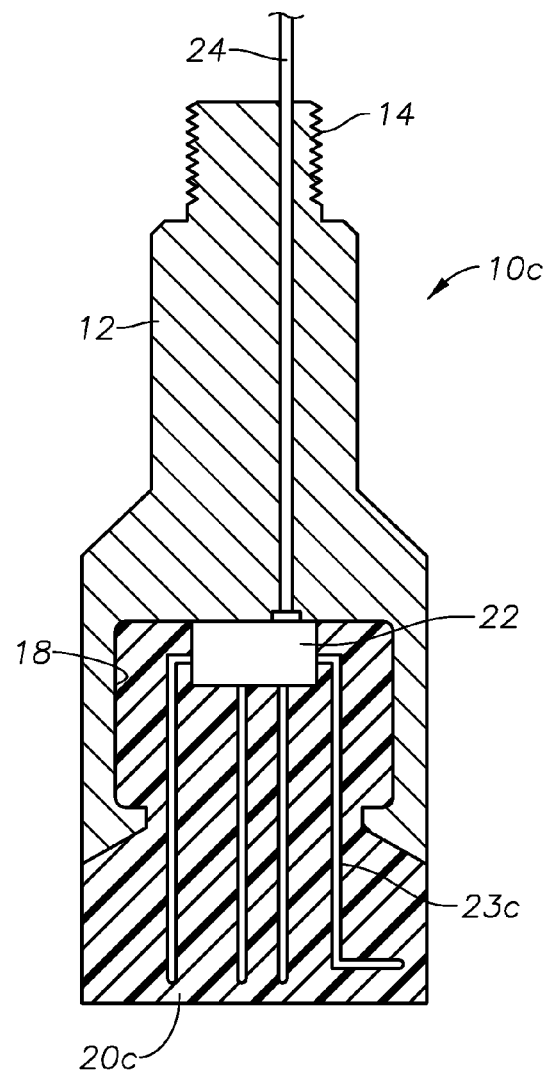
FIG. 1C is a side, cross-sectional view of a further alternative downhole impression block.

FIG. 1A depicts an alternative embodiment for an impression block 10a wherein the heating mechanism 22 has a resistive heating filament coil 23 that extends annularly in a helical manner proximate the outer circumference of the impression section 20. The resistive coil 23 will heat up when the heating mechanism 22 is energized and serves to help distribute the heat throughout the impression section 20. The embodiment depicted in FIG. 1A might be particularly useful where the stuck tool or device has a tubular shape. FIG. 1B illustrates a further alternative embodiment for an impression block 10b wherein the heating mechanism 22 has two resistive coils 23a and 23b. The coil 23b is disposed coaxially within the outer coil 23a. FIG. 1C depicts a further embodiment for an impression block 10c wherein a number of strands 23c of resistive heating filaments extend through portions of the impression section 20.

Figure 1D:
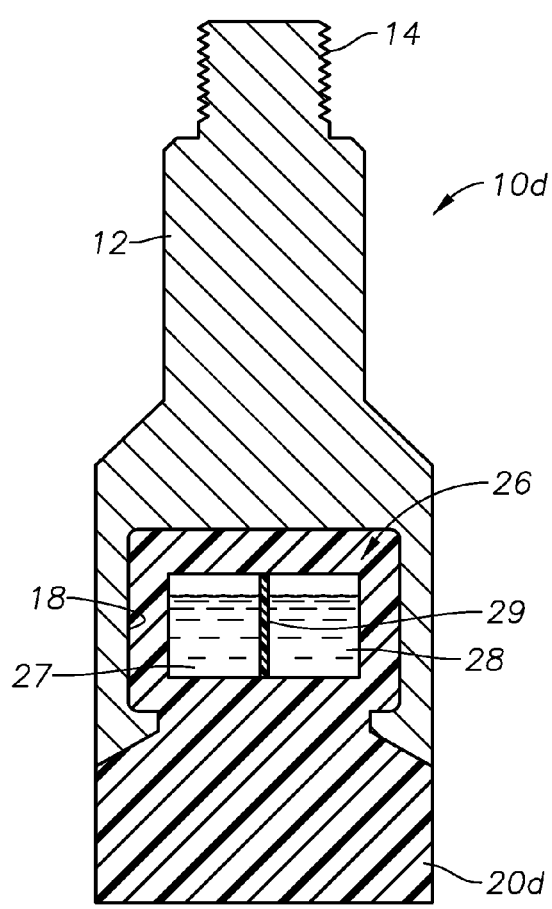
FIG. 1D is a side, cross-sectional view of a further alternative downhole impression block which includes a chemical heating mechanism.

FIG. 1D depicts an alternative embodiment for an impression block 10d wherein the impression section 20 contains a heating mechanism in the form of a chemical heating mechanism, generally shown at 26. In the depicted embodiment, the chemical heating mechanism 26 includes two chemical reservoirs 27, 28 that are separated from one another by a frangible barrier 29. The reservoirs 27, 28 each contain a chemical that, when mixed with the chemical from the other reservoir, create an exothermic reaction that will heat the impression section 20. The barrier 29 can be broken by application of pressure to the impression block 10d from the surface or in other ways known in the art. An example of chemicals that could be combined to create an exothermic reaction is calcium chloride and water. A reaction of these chemicals is typically capable of heating the environment to a temperature of about 194° F. (90° C.) from an ambient temperature of 68° F. (20° C.).

It should be understood that any of the impression blocks 10a, 10b, 10c or 10d may be used interchangeably with the impression block 10 in the impression imaging system that will be described and depicted in FIGS. 2-4.

Figure 2:
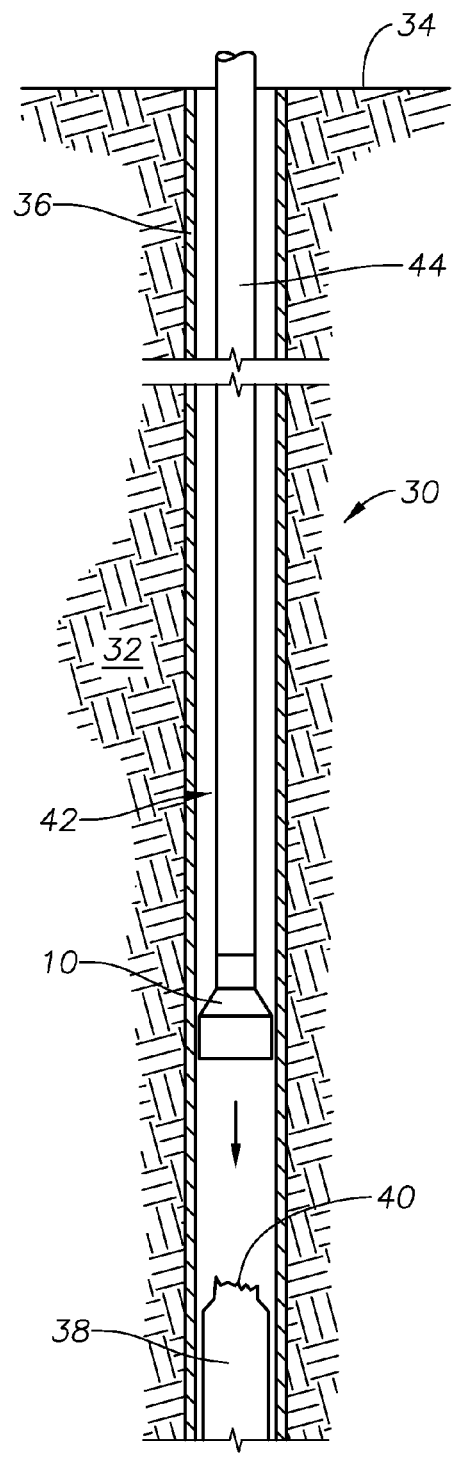
FIG. 2 is a side, cross-sectional view of an exemplary wellbore with a stuck tool and a downhole impression imaging system constructed in accordance with the present invention.

FIG. 2 depicts a hydrocarbon-production wellbore 30 that has been drilled through the earth 32 from the surface 34. It is noted that the impression block 10 and impression imaging system and method of the present invention are shown being used in conjunction with a hydrocarbon-production wellbore 30, in fact, systems and methods of the present invention may be used to obtain impressions of objects and tools in any remote or subterranean environment. The wellbore 30 has been lined with metallic casing 36. A tool 38 is stuck within the wellbore 30. Although a wellbore tool is shown, those of skill in the art will understand that the systems and methods of the present invention may also be used with objects other than tools. The tool 38 presents an irregular upper surface 40. FIG. 2 also shows a downhole impression imaging system 42 that has been constructed in accordance with the present invention. The impression imaging system 42 includes a running string 44 that extends downwardly from the surface 34 of the wellbore 30. The running string 44 is preferably formed of interconnected sections of production tubing, as is known in the art. However, the running string 44 might also be formed of coiled tubing or of other materials known in the art. It is preferred that the construction of the running string 44 be such that weight can be applied to it at the surface. An impression block 10 is affixed to the lower end of the running string 44.

FIG. 2 illustrates the downhole impression imaging system 42 in a run-in position wherein the heating mechanism 22 is preferably not energized, and the impression block 10 has not yet been placed in contact with the upper surface 40 of the stuck tool 38. While FIG. 2 depicts a general location for the heating mechanism 22 within the impression section 20, it should be understood that the specific location within the impression section 20 may vary if desired. FIG. 3 illustrates the impression imaging system 42 being used to create an impression of the upper surface 40 of the stuck tool 38. Prior to forming the impression, the heating mechanism 22 is energized to heat the impression section 20 up to or above the predetermined transition temperature, which permits the polymer section 20 to be deformed and generally conform to the shape of the upper surface 40. Once heated, the impression imaging system 42 is moved downwardly so that the impression section 20 is placed into contact with the surface 40. Preferably, some weight is applied to the running string 44 in order to create an accurate impression of the unseen surface 40 within the impression section 20. The deformed shape becomes the temporary shape of the impression section 20.

Once the impression is created within the impression section 20, the heating mechanism 22 is deenergized so that the impression section 20 can cool below its transition temperature. Once cooled, the impression section 20 will remain in the temporary shape formed by the upper surface 40. Then, the impression imaging system 42 is removed by withdrawing the running string 44 from the wellbore 30, as illustrated by the arrow 46 in FIG. 4. Because the impression section 20 remains below the transition temperature, it will remain in the temporary shape.

Once, the impression imaging system 42 has been removed from the wellbore 30, the impression block 10 can be removed and inspected by a user to determine the optimal fishing tool(s) to be used to engage and remove the stuck tool 38 from the wellbore. If desired, the impressed impression section 20 may be used as a mold to form a positive three-dimensional representation of the upper portion of the stuck tool 38.

It is noted that the impression block 10 can be returned to its original condition and reused. In order to do this, the heating mechanism 22 is reenergized to heat the impression section 20 up to or over the transition temperature. The impression section 20 will return to its original shape. Thereafter, the heating mechanism 22 can be deenergized so that the impression section 20 can cool, remaining in its original shape. The above-described process may then be used with another stuck tool or object to obtain another impression.

Figure 5:
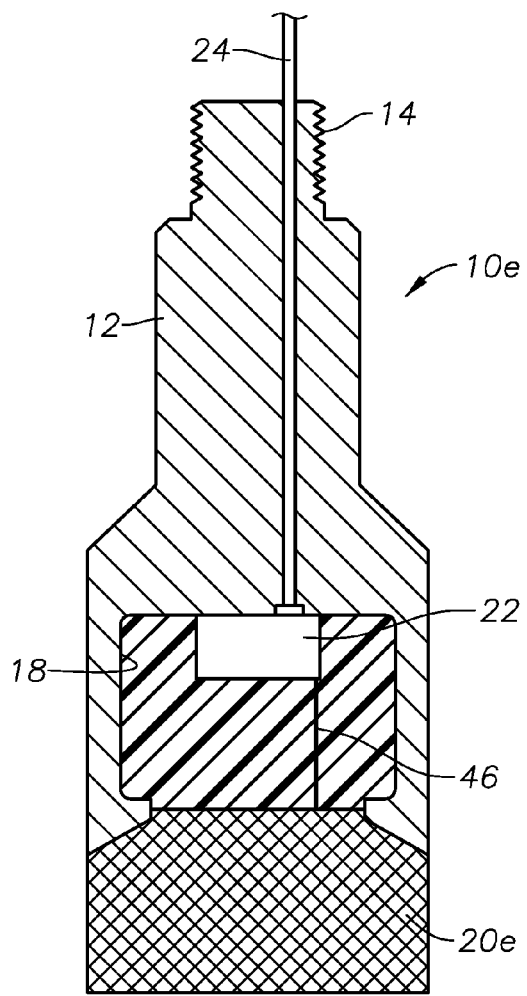
FIG. 5 is a side, cross-sectional view of an alternative embodiment for an impression imaging system which incorporates an impression block having an element formed of a metallic shape memory alloy.

FIG. 5 illustrates an alternative embodiment for a downhole imaging impression block 10e which incorporates an impression section 20e that is formed of a metallic shape memory alloy. The metallic shape memory material can be deformed from an original shape to a temporary shape below a transition temperature and will subsequently transition back to the original shape when heated up to or above a predetermined transition temperature. Examples of suitable metallic shape memory alloys include nickel-titanium, copper-zinc-aluminum-nickel and copper-aluminum-nickel. In the depicted embodiment, the impression section 20e is a mesh that is fashioned of metallic shape memory alloy filaments. In the depicted embodiment, the mesh of the impression section 20e is roughly formed into a hollow cylinder. As an alternative to mesh, metallic shape memory alloy could also be fashioned into thin plate and then formed into a hollow cylinder for use as the impression section 20e. In the depicted embodiment, an electrical conduit 46 interconnects the heating mechanism 22 with the impression section 20e so that electrical power can be transmitted to the impression section 20e, thereby causing the mesh to heat when energized.

Figure 6:
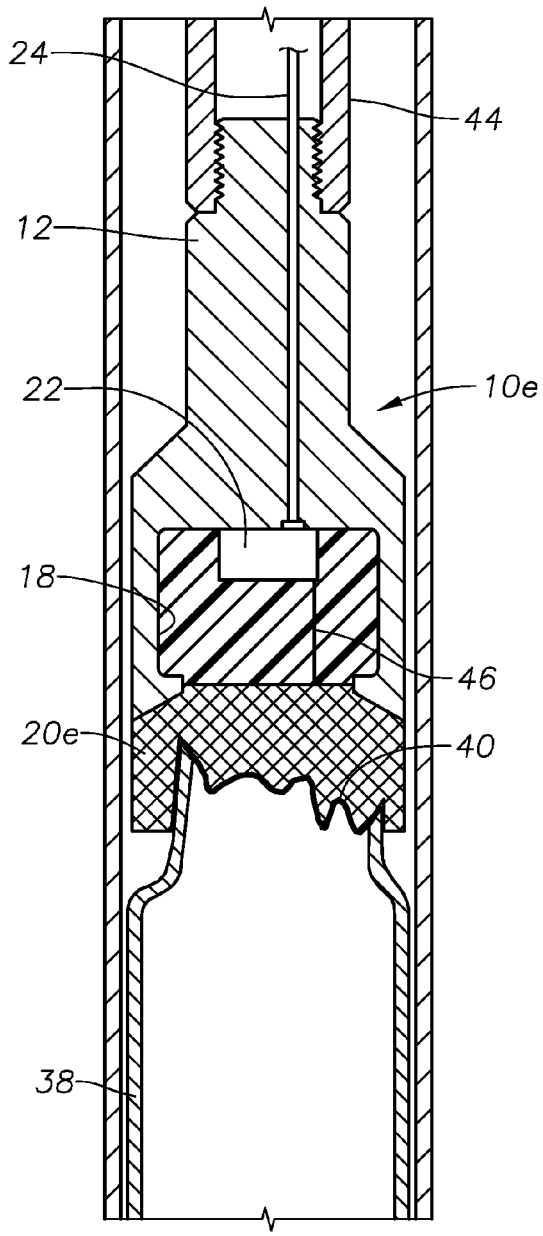
FIG. 6 is a side, cross-sectional view of the impression imaging system shown in FIG. 5, now with the impression block having been deformed.

FIG. 6 shows the impression block 10e having been brought into contact with the upper surface 40 of the stuck tool 38 with weight or force having been applied to the running string 44 so that the impression section 20e has been deformed from its original shape (FIG. 5) to a temporary shape. The temporary shape will be the impression of the upper surface 40 of the stuck tool 38. In the described embodiment, the deformation of impression block 10e will occur while the impression section 20e is not heated above its transition temperature.

In subsequent operation, the impression block 10e is brought to the surface. The impression section 20e is then examined to provide an indication of the shape of the upper surface 40 of the tool 38. The heating mechanism 22 can then be heated to cause the impression section 20e to return to its original shape. Thereafter, the impression block 10e can be reused.

It should be understood that the systems and methods of the present invention are useful in both land-based subterranean wellbores as well as subsea wellbores. In addition, the systems and methods of the present invention are useful in other subterranean and remote locations.

The foregoing description is directed to particular embodiments of the present invention for the purpose of illustration and explanation. It will be apparent, however, to those skilled in the art, that many modifications and changes to the embodiment set forth above are possible without departing from the scope and the spirit of the invention.

What is claimed is:

1. An impression block for obtaining an impression of an object within a remote environment, the impression block comprising:
   a retaining section having an attachment portion for attachment of the impression block to a running string;
   an impression section that is formed of a shape memory material that may be changed between an original shape and a temporary shape;
   wherein the impression section is formed of a shape memory polymer that may be changed between the original shape and the temporary shape when at or above a predetermined transition temperature and which retains either the original or temporary shape when below the transition temperature; or
   the impression section is formed of a metallic shape memory alloy that may be changed from the original shape to the temporary shape when below a predetermined transition temperature and will return to the original shape from the temporary shape when heated to or above the transition temperature.

2. The impression block of claim 1 further comprising a heating mechanism that can be selectively actuated to heat the impression section up to a predetermined transition temperature.

3. The impression block of claim 2 wherein the heating mechanism is energized with electrical power.

4. The impression block of claim 3 wherein the heating mechanism includes a heating filament to help distribute heating within the impression section.

5. The impression block of claim 4 wherein the heating filament is in a helical form.

6. The impression block of claim 2 wherein the heating mechanism comprises a chemical heating mechanism.

7. An impression imaging system for obtaining an impression of an object within a remote environment, the impression imaging system comprising:
   a running string for disposing the impression imaging system into the remote environment;
   an impression block affixed to the running string and comprising:
   an impression section that is formed of a shape memory material that may be changed between an original shape and a temporary shape;
   wherein the impression section is formed of a shape memory polymer that may be changed between the original shape and the temporary shape when at or above a predetermined transition temperature and which retains either the original or temporary shape when below the transition temperature; or
   the impression section is formed of a metallic shape memory alloy that may be changed from the original shape to the temporary shape when below a predetermined transition temperature and will return to the original shape from the temporary shape when heated to or above the transition temperature.

8. The impression imaging system of claim 7 further comprising a heating mechanism that can be selectively actuated to heat the impression section up to a predetermined transition temperature.

9. The impression imaging system of claim 8 wherein the heating mechanism is energized with electrical power.

10. The impression imaging system of claim 8 wherein the heating mechanism includes a heating filament to help distribute heating within the impression section.

11. The impression imaging system of claim 10 wherein the heating filament is in a helical form.

12. The impression imaging system of claim 8 wherein the heating mechanism comprises a chemical heating mechanism.

* * * * *